United States Patent [19]

Neeff

[11] 4,334,068
[45] Jun. 8, 1982

[54] PROCESS FOR THE PREPARATION OF TRIAZINYLAMINO-ANTHRAQUINONES

[75] Inventor: Rütger Neeff, Leverkusen, Fed. Rep. of Germany

[73] Assignee: Bayer Aktiengesellschaft, Leverkusen, Fed. Rep. of Germany

[21] Appl. No.: 213,242

[22] Filed: Dec. 4, 1980

[30] Foreign Application Priority Data

Dec. 18, 1979 [DE] Fed. Rep. of Germany ....... 2950876

[51] Int. Cl.³ .................. C07D 251/46; C07D 403/12; C07D 417/12
[52] U.S. Cl. ...................................... 544/187; 544/189
[58] Field of Search ......................... 544/187, 189, 188

[56] References Cited

U.S. PATENT DOCUMENTS

| | | | |
|---|---|---|---|
| 1,437,783 | 12/1922 | Steinbuch et al. | 544/187 |
| 1,523,308 | 1/1925 | Steinbuch et al. | 544/187 |
| 1,994,602 | 3/1935 | Wieners | 544/187 |
| 2,373,826 | 4/1945 | Graham | 544/187 |
| 2,716,645 | 8/1955 | Von | 544/187 |

Primary Examiner—John M. Ford
Attorney, Agent, or Firm—Sprung, Horn, Kramer & Woods

[57] ABSTRACT

Anthraquinone dyestuffs of the formula

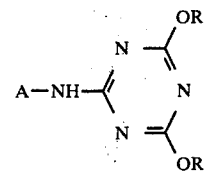

wherein
A is an optionally substituted anthraquinone radical and
R is an optionally substituted aryl radical, are obtained in outstanding yields, and without pollution of the effluent, by reacting 1 mol each of amino-anthraquinone and cyanuric chloride in excess phenol in a one-pot process and at 50°–200° C. in the absence of acid acceptors and organic solvents.

4 Claims, No Drawings

PROCESS FOR THE PREPARATION OF TRIAZINYLAMINO-ANTHRAQUINONES

The invention relates to a process for the preparation of anthraquinone compounds of the formula

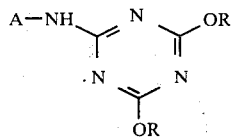

(I)

wherein
A is an optionally substituted anthraquinone radical and R is an optionally substituted aryl radical.

Compounds of this type have hitherto been prepared in a two-stage or multi-stage procedure by reaction of corresponding amino-anthraquinones with cyanuric chloride and phenols, preferably in the presence of acid acceptors and/or organic solvents (compare German Auslegeschrift No. 1,644,532, German Auslegeschrift No. 1,191,060 and Austrian Pat. No. 230,839).

However, this process was not completely satisfactory since the space/time yield left something to be desired. Moreover, troublesome effluents containing salts are obtained when acid-binding agents are used, purification of these effluents giving rise to additional costs. Furthermore, the use of solvents, which in some cases are a fire hazard, does not provide an optimum procedure, since handling and recovery of these solvents necessitates additional expenditure on apparatus.

It has now been found, surprisingly, that the compounds of the formula I are obtained in a one-stage process in outstanding yields and without the abovementioned disadvantages when 1 mol of cyanuric chloride is reacted with 1 mol of amino-anthraquinone in excess phenol without the addition of acid acceptors.

The reaction takes place in the temperature range customary for such condensation reactions, that is to say at 50°–200° C.

Suitable amino-anthraquinones are, above all, α-amino-anthraquinones, which can carry, in the remaining positions, non-ionic substituents which are customary in anthraquinone chemistry and are inert under the reaction conditions.

Examples of substituents which may be mentioned are: halogen atoms, optionally substituted amino groups, nitro groups, hydroxyl groups and mercapto groups.

Preferred process products are those of the formula

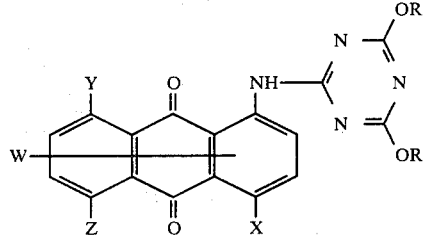

(II)

wherein
R has the abovementioned meaning,
X, Y and Z represent hydrogen, —OH, —OT, —NH—V, —ST, $NO_2$ or

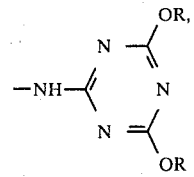

W represents hydrogen, $NO_2$ or halogen,
T represents optionally substituted alkyl, cycloalkyl, aralkyl or aryl and
V represents T or acyl.

The number of characteristic triazinylamino radicals is preferably 1 or 2.

Suitable alkyl radicals are $C_1$–$C_8$-alkyl radicals, which can be substituted, for example, by OH, $C_1$–$C_4$-alkoxy or halogen.

Suitable cycloalkyl radicals are cyclohexyl radicals.

Suitable aralkyl radicals are benzyl and phenylethyl radicals.

Suitable aryl radicals are phenyl radicals, which can be substituted, for example, by $C_1$–$C_4$-alkyl, $C_1$–$C_4$-alkoxy or halogen.

Suitable halogen atoms are bromine and, in particular, chlorine.

Particularly preferred process products correspond to the formulae

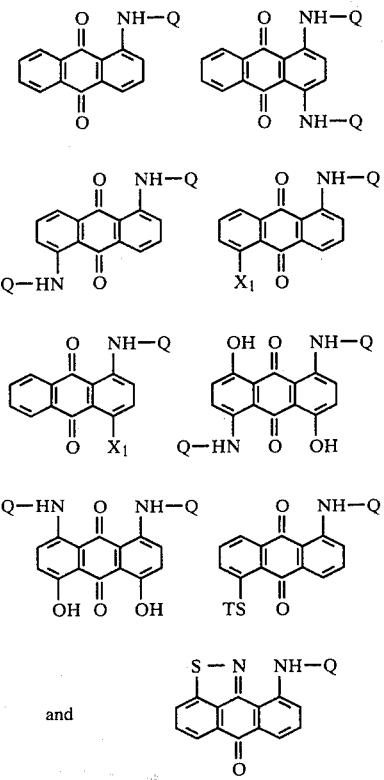

wherein
$X_1$ is OH, OT or NHT.
Q is

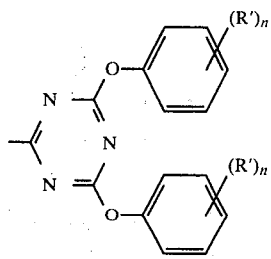

R' is $C_1$–$C_4$-alkyl, Cl or $C_1$–$C_4$-alkoxy and
n is a number from 0 to 3, preferably 0 or 1.

When carrying out the process in practice, a procedure is followed in which, for example, 1 mol each of cyanuric chloride and amino-anthraquinone are introduced into a melt of 3 to 10 times, preferably 4 to 6 times, the amount by weight (relative to the aminoanthraquinone to be employed) of a phenol and the mixture is slowly heated to 150°–180° and is kept at this temperature until the evolution of HCl has ended, which is the case after 3–6 hours.

After cooling, excess phenol is driven off with steam and the crystalline reaction product is isolated in the customary manner.

For analytical purposes, the crude product can be purified by recrystallisation.

The yields are virtually quantitative.

The process products are valuable disperse dyestuffs for dyeing synthetic fibres, or pigments for incorporation into lacquers and molten plastics.

The process products are also suitable for dyeing cellulose fibres pretreated with swelling agents.

EXAMPLE 1

Preparation of the dyestuff of the formula

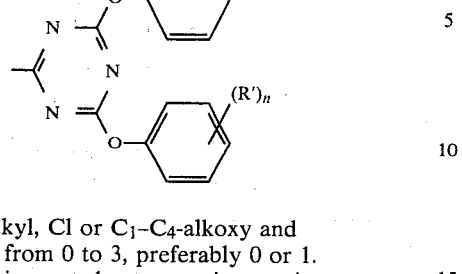

23.5 g of cyanuric chloride and then 27 g of 1-aminoanthraquinone are added to 100 g of phenol at 50°–55°. The mixture is warmed to 175° in the course of one hour and is kept at 180° for 3 hours, during which 13.3 g (=3 equivalents) of gaseous hydrogen chloride escape. After cooling the mixture to 120°, 100 ml of water are added and the unreacted phenol is driven off with steam. The yellow product, which has crystallised in small yellow needles, is filtered off at 70°–95° and dried at 80°–120°.

Yield: 57 g

Melting point: 212°–216°

The product is sufficiently pure for use as a thermosol dyestuff for polyesters.

The dyestuff is obtained in a similar quality and yield if the reaction is carried out at 150°–160° for 6 hours.

EXAMPLES 2–16

If the procedure followed is an in Example 1, but other amino-anthraquinones and phenols are used, the dyestuffs listed in the following table, which have the colour shades indicated, are obtained also in outstanding yields:

Dyestuffs of the formula

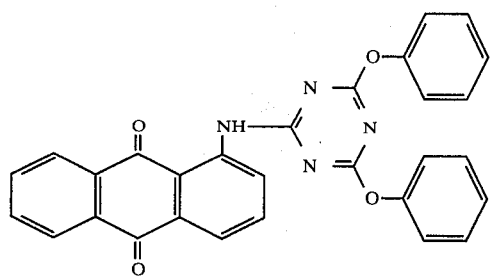

| Example | X | Y | Z | W | R' | Colour shade |
|---|---|---|---|---|---|---|
| 2 | H | H | Benzoylamino | H | Phenyl | yellow |
| 3 | Benzoylamino | H | H | H | p-Tolyl | yellowish-tinged red |
| 4 | OH | H | H | H | Phenyl | scarlet |
| 5 | OH | H | H | H | p-t-Butyl-phenyl | scarlet |
| 6 | H | H | NHQ | H | Phenyl | reddish-tinged yellow |
| 7 | NHQ | H | H | H | m-Methoxy-phenyl | yellowish-tinged red |
| 8 | OH | OH | NHQ | H | p-Tolyl | blue-grey |
| 9 | OH | NHQ | OH | H | Phenyl | blue-grey |
| 10 | Phenylamino | H | H | H | Phenyl | blue |
| 11 | Cyclohexyl-amino | H | H | H | p-t-Butyl-phenyl | blue |
| 12 | Methoxy | H | H | H | o-Tolyl | orange |
| 13 | H | H | S—⟨phenyl⟩ | H | Phenyl | yellow |
| 14 | H | H | H | 6/7-Cl | Phenyl | yellow |
| 15 | H | H | H | 6/7-NO₂ | p-Ethoxy-phenyl | yellow |

-continued

Dyestuffs of the formula

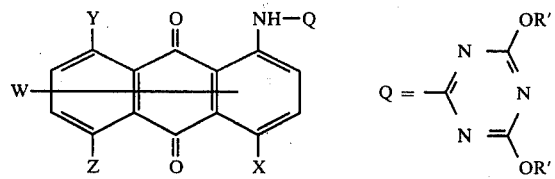

| Example | X | Y | Z | W | R' | Colour shade |
|---|---|---|---|---|---|---|
| 16 | OH | ·OH | NO₂ | H | Phenyl | reddish-tinged blue |

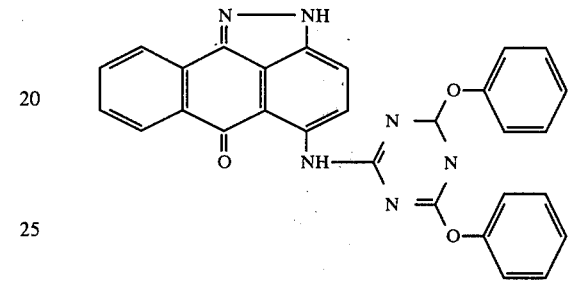

which dyes polyester fibres in greenish-tinged yellow shades, is obtained in an analogous manner.

I claim:

1. A process for the preparation of a monoanthraquinonyl-amino-diaryloxy-triazine of the formula

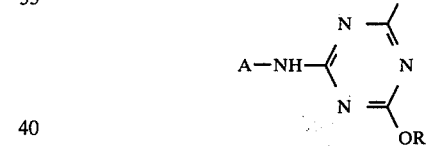

wherein
  A is an anthraquinone radical and
  R is an aryl radical, comprising condensing one mol of the corresponding amino-anthraquinone with one mol of cyanuric chloride and an excess of the corresponding phenol at elevated temperature in a one-stage procedure in the absence of acid acceptors and extraneous organic solvents.

2. A process according to claim 1, wherein the reaction is carried out at 50°-200° C.

3. A process according to claim 1, wherein the reaction is carried out with 3 to 5 times the amount of phenol by weight of anthraquinone.

4. A process according to claim 1, wherein the amino-anthraquinone is an α-amino-anthraquinone.

EXAMPLE 17

Preparation of the dyestuff of the formula

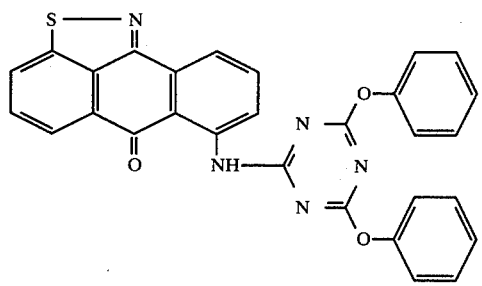

23.5 g of cyanuric chloride and 30.5 g of 5-amino-1,9-isothiazolanthrone are added to 110 g of phenol and the mixture is warmed to 175°-180° in the course of about 1 hour. It is kept at this temperature until no further hydrogen chloride is split off, which takes about 3 hours, 120 ml of water are added and the unreacted phenol is driven off with steam. The product, which has crystallised in small yellow needles, is filtered off and dried at about 100° C. to give 62 g of the abovementioned dyestuff, which dyes polyester fibres in luminous yellow shades by the thermosol process. If, instead of the 5-amino-1,9-isothiazolanthrone, an equivalent amount of 4-amino-1,9-pyrazolanthrone is used, the dyestuff